May 21, 1940.　　　　　A. CROCE　　　　　2,201,556
PLANTER
Filed March 28, 1938
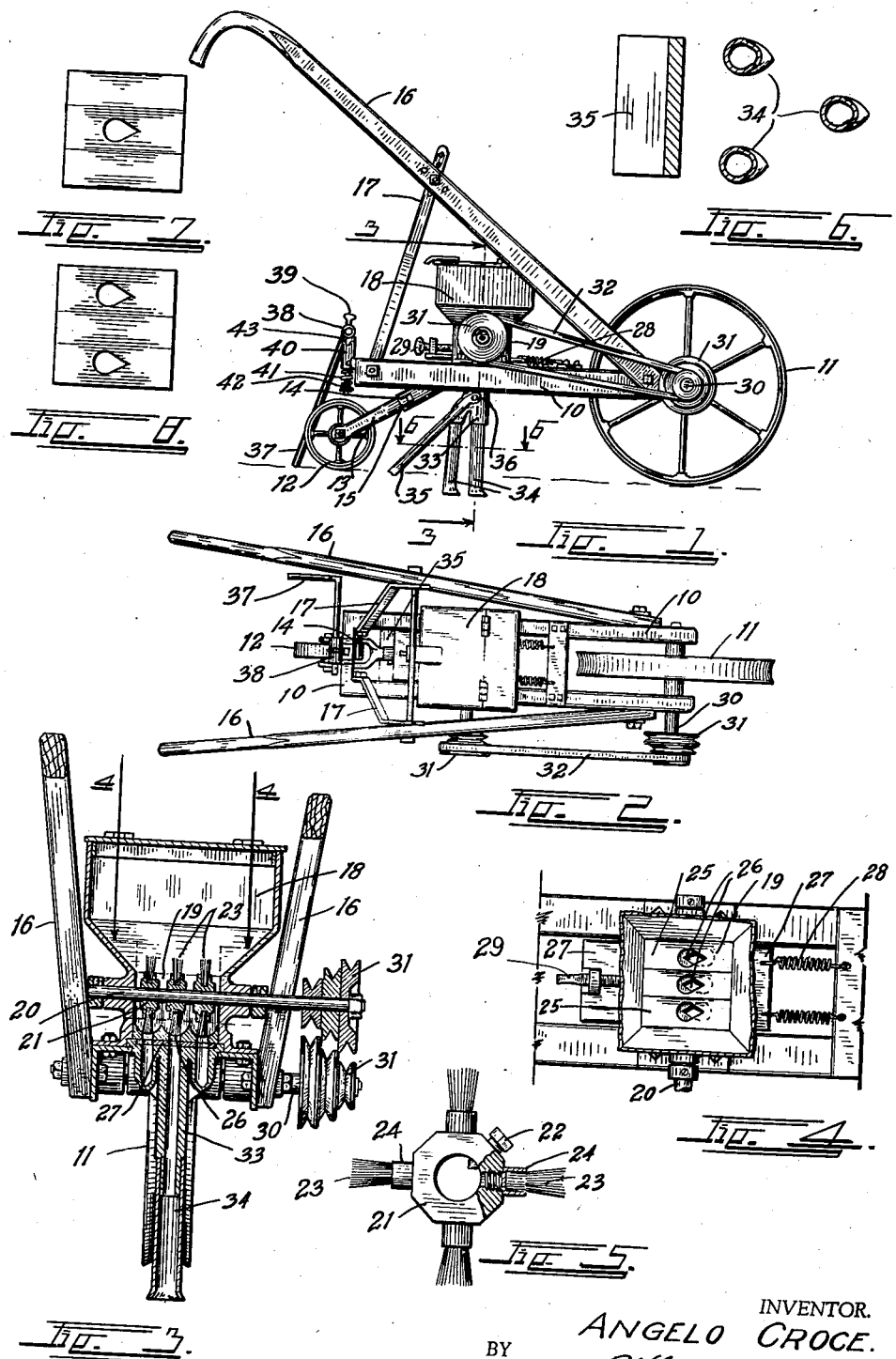
INVENTOR.
ANGELO CROCE.
BY
ATTORNEY.

Patented May 21, 1940

2,201,556

UNITED STATES PATENT OFFICE 2,201,556

PLANTER

Angelo Croce, Welby, Colo., assignor of forty-nine per cent to Joseph F. Heffner, Denver, Colo.

Application March 28, 1938, Serial No. 198,446

1 Claim. (Cl. 221—130)

This invention relates to a planter, more particularly to a seed planter for use by truck gardeners, nurseries, and the like which have relatively small plots of ground from which a maximum yield is desired.

The principal object of this invention is to provide a planter which will simultaneously plant a plurality of rows of plants and which will uniformly and economically distribute the seeds along each row.

Another object of the invention is to provide means on the planter for automatically marking the position of the next row at either side of the row being planted.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the complete planter.

Fig. 2 is a plan view thereof.

Fig. 3 is an enlarged section taken on the line 3—3, Fig. 1.

Fig. 4 is a fragmentary horizontal detail section taken on the line 4—4, Fig. 3.

Fig. 5 is a detail view of what will be herein designated the seed brush.

Fig. 6 is a horizontal section through the seed spouts, taken on the line 6—6, Fig. 1.

Figs. 7 and 8 illustrate alternate types of seed plates for use in the planter.

The improved planter employs a main frame member 10, supported at its forward extremity on a single drive wheel 11 and at its rearward extremity on a follower wheel 12. The follower wheel is mounted in a wheel yoke 13 which is adjustably mounted in a receiving sleeve 14, in which it may be locked by means of a suitable set screw 15.

A pair of handle bars 16 extend upwardly and rearwardly from the forward extremity of the frame member 10 and are supported at any desired height thereon by means of an adjustable brace 17.

A seed hopper 18 is mounted on the frame 10. The hopper 18 terminates at its bottom in a brush chamber 19, through which a brush shaft 20 extends. A series of brush hubs 21 are mounted at intervals along the shaft 20 within the chamber 19 and are set thereon by means of suitable set screws 22.

The brush hubs each carry a plurality of uniformly separated brushes 23, preferably consisting of threaded sleeves 24, which are screwed into the hubs 21, each of which carries a tuft of bristles to form the brushes.

Immediately below the brush members is a channeled seed plate 25, there being one channel in the plate below each of the brushes. The seed plate rests by gravity in the bottom of the brush chamber 26. A slidable valve plate 27 is positioned below the seed plate. The valve plate contains similar, but oppositely faced, seed openings or ports which can be brought into register with the openings 26 by horizontal movement of the plate 27. As illustrated, the plate is urged in one direction by means of suitable springs 28 and is adjustively moved in the opposite direction by means of an adjusting screw 29. Regulation of the plate 27 regulates the size of the discharge orifices from the said hopper. The orifice, caused by the coaction of the two plates is diamond-shaped, as illustrated in Fig. 4.

The shaft 20 is driven from a drive shaft 30, upon which the drive wheel 11 is locked, through the medium of stepped pulleys 31 and a drive belt 32. By changing the position of the belt 32 on the pulleys 30, three different changes of relative speed of the brush members may be obtained.

Immediately below the plate 27 is a seed spout boot 33 from which three seed spouts 34 project. The seed spouts 34 are preferably arranged with the center spout leading and the two remaining spouts following in the rear and at each side thereof, as shown in Fig. 6.

A furrow closer 35 follows the spouts 34. The furrow closer consists of a wide, flat paddle-like member which is hinged to the boot at 36 and rests on the ground at its rear extremity under the influence of its own weight.

A furrow marker 37 projects outwardly and downwardly at the rear side of the frame 10. The member 37 consists of an L-shaped bar secured in a pivoted sleeve 38 by means of a suitable set screw 39. The sleeve 38 is mounted on a vertical shaft 42 which extends downwardly through a vertical sleeve 40 and through a compression spring 41. The spring acts to constantly urge the vertical shaft 42 downwardly. The vertical sleeve 40 is notched and the horizontal sleeve 38 is provided with tenons 43 which fit into the notches to maintain the marker 37 at right angles to the axis of the frame. By lifting upon the sleeve 38, the tenons may be released from their notches and the marker 37 can be swung around 180° to place it upon the opposite side of the frame when returning on the rows.

It is believed that the operation of the device can be fully understood from the above description and drawing. Briefly, the entire machine is pushed along the desired rows by hand. The front seed tube 34 plows a seed groove or furrow in the ground and guides the seeds into the furrow. The two following seed tubes 34 form a furrow at each side of the center furrow and in doing so throw the soil over the first furrow. All of the furrows are then closed by means of the furrow closer 35 which sweeps the soil thereover.

The seeds are uniformly fed into the seed furrows by means of the brushes 23 which continually sweep the seeds along the grooves or channels across the discharge orifices in the plates 25 and 27. The grooves in these plates concentrate the seeds over the orifices and the rotating brushes keep them in movement so that they cannot pack thereon. The brushes, being flexible, cannot become embedded or packed in the seeds and always rotate freely.

As the operator moves along the furrow, he plants three rows of seed simultaneously and marks the position, by means of the marker 37, for the next rows. Thus, a uniform row spacing and a uniform distribution of seeds is obtained. The latter distribution can be regulated to suit the particular seeds being used by means of the belt and pulley relations as well as the orifice size.

The seed plate 25 is removable and may be replaced by a plate having either one central hole, as shown in Fig. 7, or one having two side holes, as shown in Fig. 8, should single or double row planting be desired for the larger root plants.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A multiple row seed planter comprising: a seed hopper; a rectangular brush chamber in the bottom of said hopper; a seed distributing boot closing the bottom of said chamber and having vertical seed passages opening to said chamber through its upper face; a sliding valve plate resting on the upper face of said boot and provided with ports which may be brought into register with said passages; a removable seed plate shaped to fit within said brush chamber and resting by gravity on said valve plate, said seed plate having openings in register with said passages; a brush shaft extending across said seed plate; a brush on said shaft over each of said openings; a series of grooves extending throughout the length of the upper face of said seed plate, there being a groove beneath each of said brushes; and means for rotating said shaft.

ANGELO CROCE.